June 1, 1937.　　　R. G. BOURDON　　　2,082,535
SIGNAL AND BRAKE TESTING DEVICE FOR MOTORCARS AND THE LIKE
Filed Feb. 27, 1936　　　4 Sheets-Sheet 2
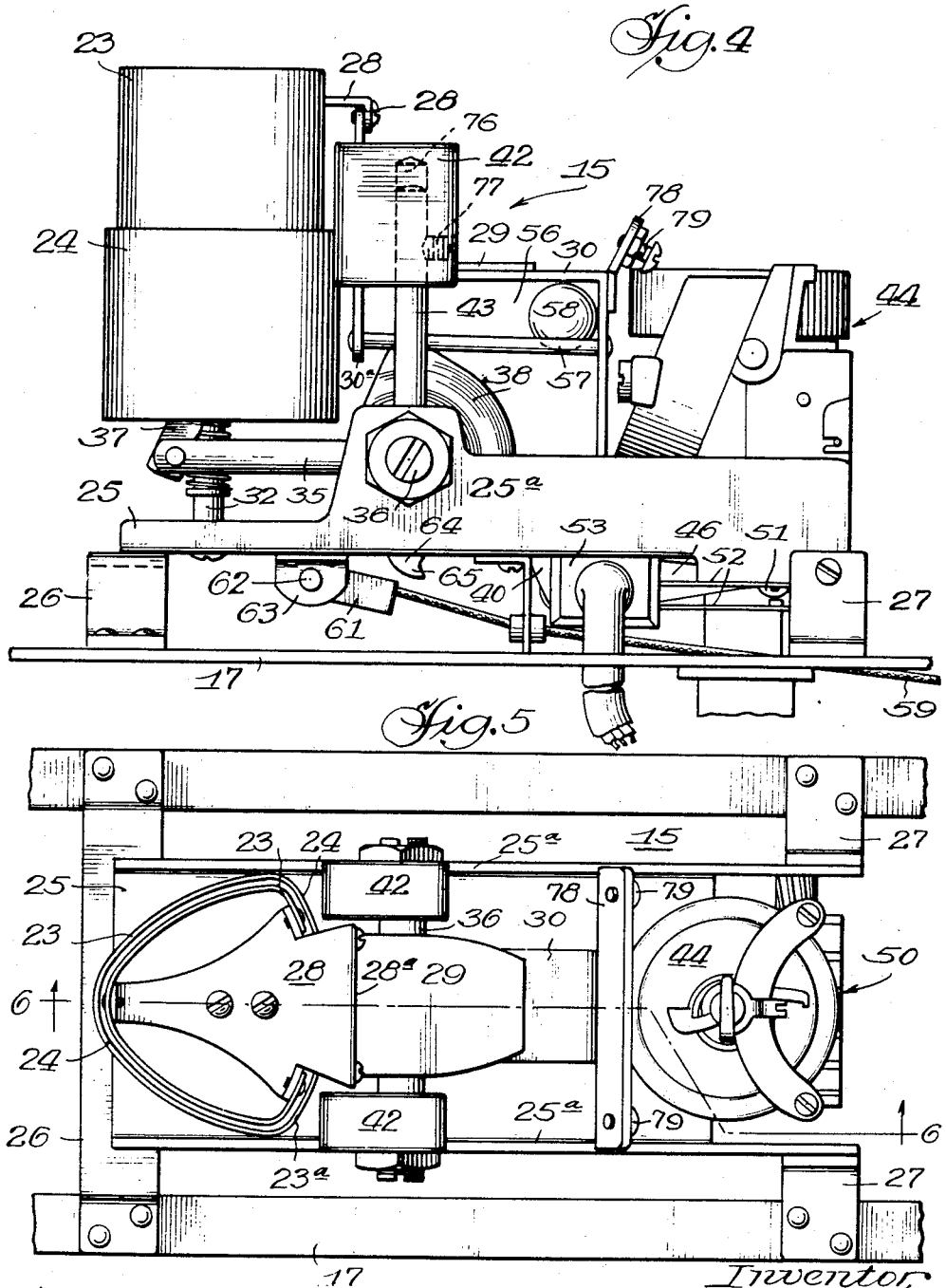

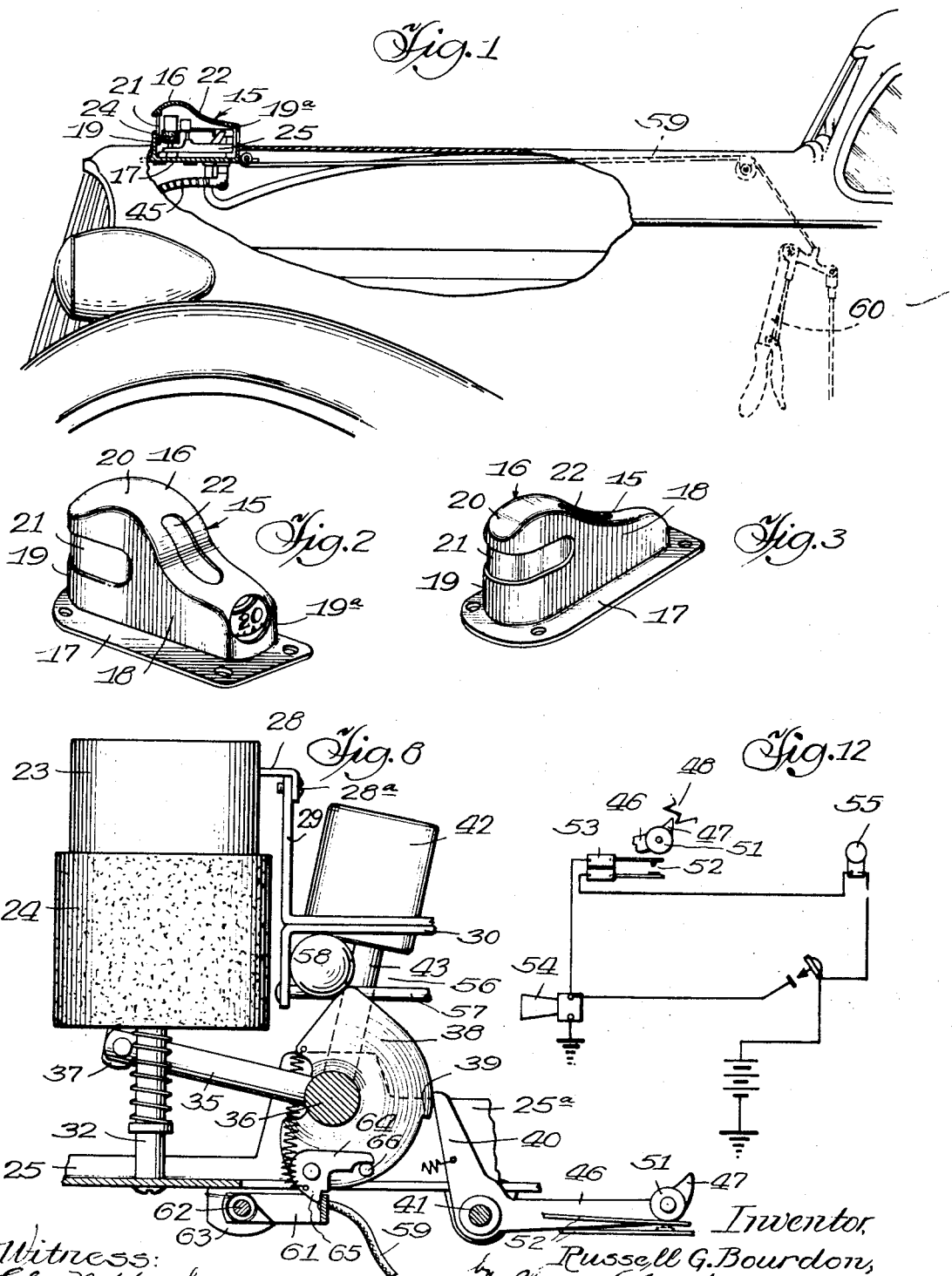

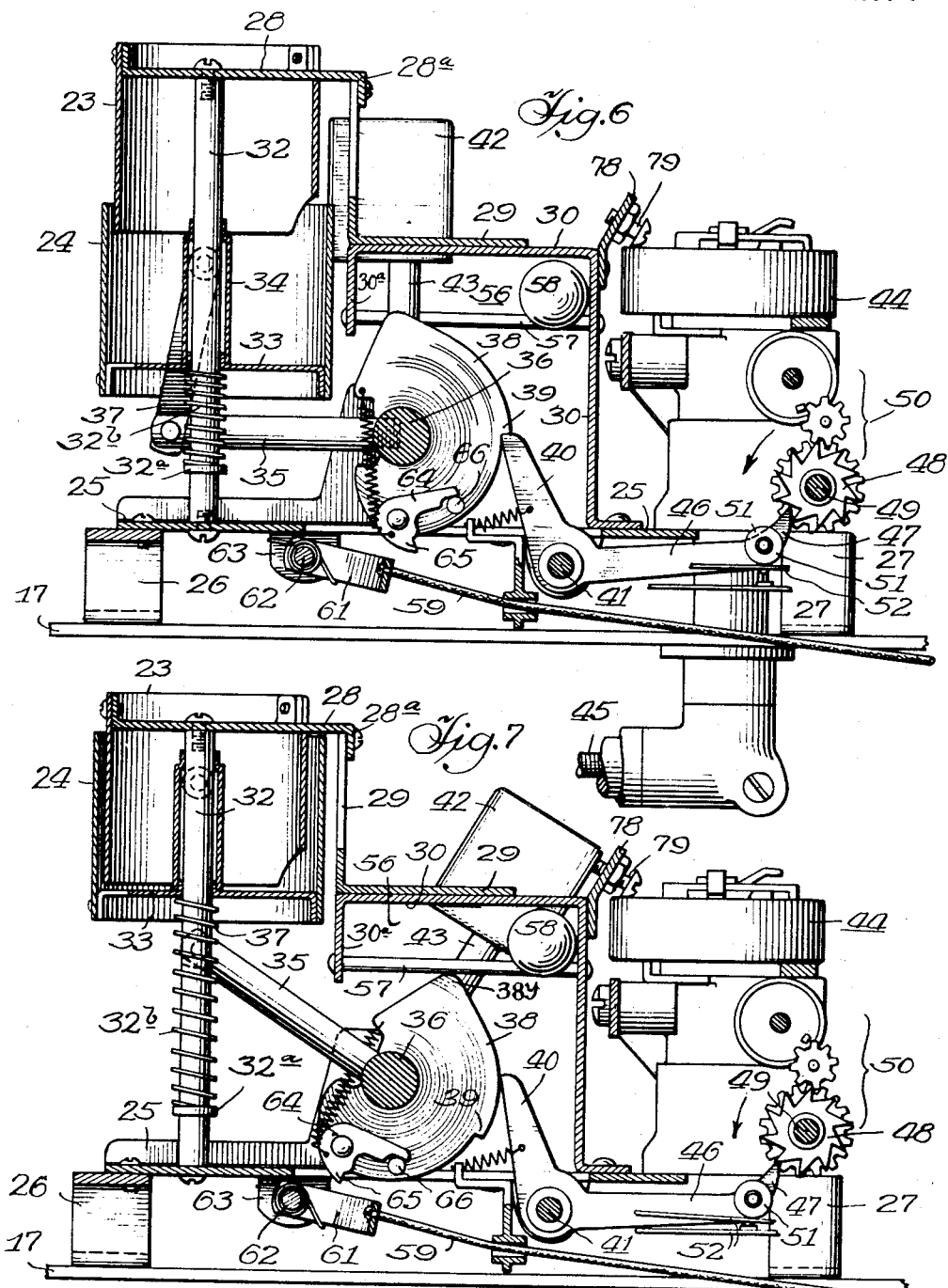

June 1, 1937.  R. G. BOURDON  2,082,535
SIGNAL AND BRAKE TESTING DEVICE FOR MOTORCARS AND THE LIKE
Filed Feb. 27, 1936  4 Sheets-Sheet 4
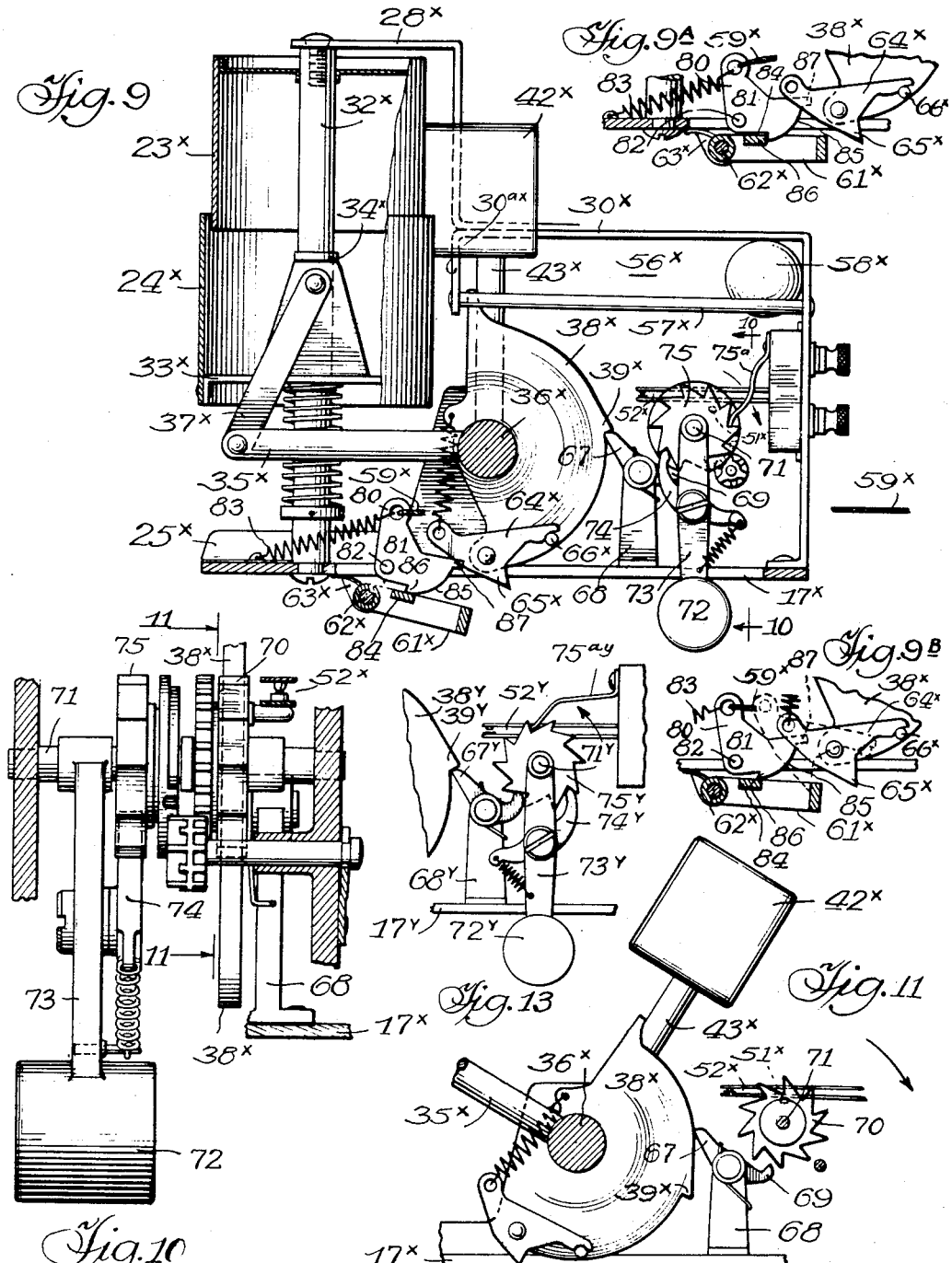
Inventor
Russell G. Bourdon Patented June 1, 1937

2,082,535

UNITED STATES PATENT OFFICE 2,082,535

SIGNAL AND BRAKE TESTING DEVICE FOR MOTORCARS AND THE LIKE

Russell G. Bourdon, Muskegon, Mich., assignor of one-third to L. H. Rietdyk and one-third to R. H. McGowan, Muskegon, Mich.

Application February 27, 1936, Serial No. 66,001

25 Claims. (Cl. 116—114)

This invention relates to a combination signal and brake testing device to indicate and determine the brake conditions of motor cars and the like at predetermined intervals, and consists of the matters hereinafter described and more particularly pointed out in the appended claims.

In the operation of motor cars, the failure of the brakes to reduce the speed of or to stop the car at the rate or in the length of travel for which the brakes are designed and adjusted, is the cause of many accidents which would not have occurred had the brakes been properly adjusted. Neither the driver nor an outside observer, as a traffic policeman, can know the brake conditions of any car driven along a highway until too late and after an accident has happened, when it may be found to have resulted from faulty brakes.

To cure the matter, service stations, states and municipalities, have recommended and/or have demanded frequent brake tests at regular stated intervals, or at the ends of successive prescribed mileages traveled. But such recommendations or demands have had little or no result in reducing accidents due in part or in whole to failure of brakes, because of the human element upon which such tests depend to be made at the recommended or prescribed intervals.

The object of this invention is to provide a device to be attached to or to be associated with a motor car, which will automatically display and/or sound a danger signal to the driver and/or to anyone on the road, that the interval, however predetermined, throughout which a motor car should be operated without test, has terminated; and by which a prescribed brake test not only may be made at once by the driver, but which compels the prescribed test with result adequate to meet such test, when the brakes are applied, in order to eliminate the danger signal.

Another object of the invention is to provide a device of the kind which cannot be tampered with by the driver and cannot be manipulated to eliminate the danger signal until the brakes, if defective and not responsive to the designed test, are properly adjusted.

Another object of the invention is to include in the device, automatic features to prevent the driver, when the foot brake fails to meet the designed test, from eliminating the danger signal by making the test when applying the emergency brake.

These and other advantages of the invention will appear more clearly as I proceed with my specification.

In the drawings:—

Figure 1 is a side elevation of the hood of an automobile partially broken away with a sectional view of the signalling device as applied to the front end thereof;

Figure 2 is a perspective view of the signalling device looked at from the rear;

Figure 3 is a perspective view of the same as it appears when looked at from in front;

Figure 4 is a side elevation on an enlarged scale of the device with the casing removed;

Figure 5 is a top plan view of the same;

Figure 6 is a vertical section through the device in a plane indicated by the line 6—6 of Figure 5;

Figure 7 is a like section with the parts shown in a different relation;

Figure 8 is a partial side elevation of the mechanism with the parts shown in a position to be described later;

Figure 9 is a view similar to Figure 6, showing a modified form of the device;

Figure 9a is a detailed view of parts of the mechanism shown in Figure 9 with said parts in different relation as hereinafter described;

Figure 9b is a view showing still another position of the parts shown in Figure 9;

Figure 10 is an enlarged sectional view of the parts shown in Figure 9 in a plane indicated by the line 10—10 thereof;

Figure 11 is a view showing part of the mechanism of Figure 9 with the members in a different position;

Figure 12 is a wiring diagram to be described later; and

Figure 13 is a view showing another slight modification of the device.

The improved signal and brake testing device depends for its operation upon prescribed and predetermined intervals of some kind associated with the operation of the car. Such intervals may be intervals of (a) mileage, as determined by and related to the familiar speedometer. Again, such intervals may be determined by and related to (b) the number of times the brake is applied when running the car. Such intervals also may be determined by and related to (c) elapses of time during which the car is operated. For illustrating the invention, I have shown and described herein devices subject to such intervals as (a) and (b); but it will be understood that the invention in its broader aspect is not limited to the character of the interval or to the mechanism for determining such interval.

Referring now to the embodiments of the invention illustrated and described herein:—15 indicates the signal and brake testing device as a whole. It may be applied to or associated with a motor car or the like at any desired position where it will be observable not only to those in the car, but also to outsiders. As shown, it is carried at the forward end of the hood (see Figure 1), to which it may be connected for support in any convenient manner. As shown in the drawings, it is located at or near the position heretofore occupied by the radiator cap, which, in the more modern cars is discarded, the cooling water being introduced into a pipe or tube accessible only by raising the hood.

The device 15 is conveniently enclosed in a shell or casing 16 mounted on a base 17 and having upright side walls 18, front and rear walls 19, 19a, and a top wall 20 of such form as to follow the outline of the mechanism of the signal and brake testing device. The front wall 19 of the casing is provided with an opening or window 21 which extends horizontally about the side walls 18 to expose the signal—safe or danger—to the view of one in front or at either side of the car to which the device is applied. The top wall 20 is provided towards the rear with an opening 22 through which said signal may be observed by those in the car. These openings are preferably protected by glass, celluloid, or other transparent material.

The device is designed to display at the said openings 21 and 22, the signal green, when the car is running under ordinary approved conditions; and to display at said openings the signal red at the end of a prescribed interval of whatever kind upon which the operation of the device is based. And the red signal may not be displaced and the green signal restored except by the operation of the car by application of the brakes to meet and successfully respond to the prescribed test.

23 indicates the safe, or green, signal and 24 indicates the danger, or red, signal. These signals are mounted on a frame 25 suitably supported by brackets 26, 27 rising from the base 17. The signals 23 and 24 may be of any suitable material and/or construction and may be disposed with reference to each other and mounted upon the frame 25 in any manner convenient for their disposal in a small space and for such relative movement between them as may be required to bring about the display of but one at a time.

As shown, the two signals 23 and 24 are in the form of tubular shells having a common vertical axis, and the shell 24, which is greater in diameter than the shell 23, is mounted to move up or down with reference to the shell 23.

The shell 23 has a plate 28 fixed within its upper end. Said plate 28 has a depending flange 28a at a point spaced rearwardly from the shell 23, where it is attached to and supported by a bracket comprising angle plates 29 and 30 rising from and supported by the frame 25. 32 indicates a vertical rod extending from the plate 28 to which its top end is secured, to the frame 25 to which its bottom is secured. The signal device 24, by a bar 33 secured at its lower end and a bearing sleeve 34 fixed to said bar 33, is mounted for reciprocable vertical movement on the rod 32. As shown in Figures 4 and 6, the two signal members are disposed the one with respect to the other, as under normal conditions when the green signal is displayed. As shown in Figure 7, the signal elements 23 and 24 appear in that relation where the red signal 24 has been raised to cover and/or shroud the signal 23, leaving the red signal 24 only in display position. This movement is brought about by means of crank pins 35 spaced at either side of the rod 32 fixed to a horizontal rock shaft 36 rotatably mounted in vertical flanges 25a, 25a of the frame 25 and by pitmans 37, 37 connecting said crank pins with said bearing sleeve 34.

On the rock shaft 36, between the two crank pins 35, is fixed a cam 38. This cam has a tooth 39 which is normally engaged by a spring-controlled pawl 40 pivotally mounted on a stud 41 carried below the frame 25. 42, 42 indicate weights mounted on radius arms 43, 43 fixed to the shaft 36 near its ends. In the normal position of the parts, as shown in Figures 4 and 6, with the green signal exposed to display, the radius arms 43, 43 are in vertical position so that the weights 42 are in position to act as an inverted pendulum. In this position, the pawl 40 engages the tooth 39 of the cam 38. When the pawl 40 is disengaged from the tooth 39, the weights 42 act to rock the shaft 36 to swing the crank pins 35 upwardly, thereby moving the signal 24 from the position shown in Figure 6, to that shown in Figure 7, with the red signal in display position. Preferably, in order to start this movement of the weights, the danger signal 24 is normally impelled upwards by means of a coiled spring 32b interposed on the rod 32 between the bar 33 and a collar 32a fixed to said rod 32.

In Figures 4 to 8, inclusive, the improved device depends for its operation upon a mileage interval and includes or is connected with a speedometer which controls the operation of the pawl 40. 44 indicates such speedometer, mounted, as shown, on the frame 25 and connected by a cable 45 to the wheels of the motor car. The pawl 40 has connected rigidly to it, a heel 46 which carries a tooth 47 engaged by a ratchet 48 on the shaft 49. Between the speedometer and the ratchet 48, which rotates in the direction of the arrow shown in Figures 6 and 7, there are interposed the usual reduction gearing members, indicated generally by the numeral 50, by means of which the ratchet 48 is made to rotate one tooth each time a predetermined number of miles, as say 300 or 500, has been counted on the speedometer. Such mechanism is familiar and needs no further description. As a result of this connection, the ratchet 48, by engagement with the tooth 47 of the heel 46, actuates the pawl 40 at the end of such predetermined mileage to disengage the cam 38. Whereupon, the red signal is raised to cover the green signal, as heretofore described.

In addition to the relative shift in the signals 24 and 23, a horn and/or lamp may also be operated to direct attention of the driver and/or of an outside observer to the fact that an end of the prescribed mileage has been reached by the car. To this end, the heel 46 of the pawl 40 carries a roller 51 which engages a spring contact 52 of a switch in circuit with a horn and/or a lamp, as indicated by the wiring diagram in Figure 12. The movement of the heel 47 closes the contact switch 53 in circuit with the horn 54 and/or with the lamp 55.

It is now necessary, in order to restore the green signal to display position and to eliminate the other danger signals, the horn and/or the like, for the driver to make the prescribed test of his brakes, as for example, that the brake must be capable of stopping the car within a predetermined number of feet, as 18 feet, when the car is traveling at a certain rate of speed, as, say, 20 miles per hour. And the weights 42 and the radius arms 43 are designed and adjusted to that end. With the parts in the position shown in Figure 7, the driver drives his car at the prescribed rate per mile and then applies his brakes. If the car comes to a stop within said predetermined limit of distance, the momentum acquired by the weights 42 in the forward movement of the car at the time said movement is arrested, is sufficient to swing the weights 42 from the position shown in Figure 7 to the vertical position above the rock shaft, shown in Figure 6. Thereupon the spring-controlled pawl 40 will engage the tooth 39 of the cam 38 and thus lock the weights and also the red signal 24 in its original lower position, where the green signal is on display. Unless, however, the car stops in this distance, the shift of signals will not occur.

Upon failure of the test, the driver, to escape the trouble and/or expense of having his brakes adjusted to meet the prescribed test and to again display the green signal, may try to reduce the required momentum of the weights 42 to shift the signals as above described, by driving his car down hill, thereby inclining the frame 25 of the device forwardly and downwardly and bringing the weights 42 nearer to a position vertically above the axis of the shaft 36 than they are when the frame is in a horizontal position, as shown in Figure 7. He is prevented from doing this, however, by the mechanism now to be described.

Above the cam 38 is provided a horizontal cage 56. The horizontal member of the angle plate 30 provides the top of this cage. The vertical part of said plate provides a rear wall for said cage and a depending flange 30a at the front end of said plate provides the front wall of said cage. Spaced rods 57 located at either side of the plane of the cam 38 provide the bottom of said cage. A ball 58 is supported on said rods. The cam 38 merges at its forward end into a radial extension 38y, which is adapted to project upwardly between said rods 57 in the movement from its position shown in Figure 7 to its position shown in Figure 6. In the normal operation of the device, with the car running on a horizontal road, the ball 58, being the lighter, will start to roll in advance of any movement of the weights 42 from the position shown in Figure 7 to the position shown in Figure 6. However, the ball 58 has some distance to go; and before it reaches a point in the neighborhood of the cam projection 38y of the cam 38, said cam projection will have traveled far enough to rise above the rods 57 and arrest the forward movement of the ball. The cam, back of its projection 38y, is so designed that it travels in a path just slightly below the level of the bottom surface of the ball 58, so that there will be no possibility of the ball in its forward movement, jamming against the cam.

If the driver attempts to manipulate the signals by applying his brakes when driving down hill, the ball 58 will seek the front end of the cage, as shown in Figure 8. In such position the ball is directly in the path of the cam 38 and when, because of the sudden arrest of the car, the weights 42 are swung towards their normal upright position, the ball 58 will be struck by the cam 38 and arrest that movement, the weights being in unstable equilibrium then returning the danger signal to display position.

Again, the driver might use his emergency brake to stop the car within the required predetermined distance. This, however, is prevented by the following mechanism.

59 indicates a cable (see Figures 1, 6, 7 and 8), which is connected to the emergency brake indicated at 60. This cable is connected to a spring-controlled catch 61 pivoted at 62 to ears 63 depending from the bottom of the frame 25 in the plane of the cam 38. On the cam 38 is a spring-controlled pawl 64 having a tooth 65 which depends above the catch 61. Said pawl is limited in its movement by a pin 66 fixed to the cam 38. The catch 61 is normally held out of the path of the tooth 65 of the pawl 64 by the cable 59 connected to the emergency brake, as shown in Figures 6 and 7. But its spring tends to swing it into said path and will do so when the cable 59 is loosened, as shown in Figure 8, either in the use of the emergency brake or in case said cable is severed. When the car is operating under normal conditions, with the green signal set and the cam 38 in normal position, as shown in Figure 6, an upward swing of the catch 61 is immaterial. But, when the signal and the parts connected therewith have been shifted to red, as shown in Figure 7, then if the cable 59 be loosened, as by operating the emergency brake, the catch 61 would swing up into the position shown in Figure 8, where it would be engaged by the tooth 65 of the pawl 64, locking the cam and the weights in unstable equilibrium so that they will again fall back into the position shown in Figure 7, with the red signal 24 on display.

In Figures 9, 10 and 11, there is shown a modification of the device, in which the predetermined interval is determined by and dependent upon the number of times the brakes are operated. Here the speedometer is eliminated. The other parts are as hereinbefore described and are marked with the same numerals, with the superfix $x$.

38$x$ indicates the cam with its tooth 39$x$. 67 indicates the spring-controlled pawl for engagement with the tooth 39$x$. Said pawl is supported on the standard 68 rising from the base 25 and has a heel tooth 69 adapted to be engaged by a ratchet wheel 70 mounted on a horizontal shaft 71 suitably supported by the frame members of the device. On the shaft 71 is pivotally hung a weight 72 and radius or pendulum arm 73. The pendulum arm 73 carries a spring-controlled pawl 74 which engages a ratchet wheel 75 also mounted on the shaft 71 and a back lash or brake spring 75a. The relative location of the two ratchets and the pawls with which they are associated may be observed in Figure 10.

Intermediate the ratchet wheel 75 operated by the pendulum arm and weight 72, 73 and the ratchet wheel 70, which actuates the pawl 67 engaged with the tooth 39$x$ of the cam 38$x$, is the familiar reduction gearing whereby a predetermined number of operations of the ratchet wheel 75 must be made to move the ratchet wheel 70 one tooth.

Each time the brakes are operated to stop the car, the momentum of the car communicated to the pendulum weight 72, will swing said weight forward, thereby moving the ratchet wheel 75 one tooth. After the brakes have been applied, the required predetermined number of times to arrest the car, the last forward movement of the weight, through the ratchet wheel 75 and the intermediate reduction gearing to the ratchet wheel 70, the pawl 67 will be swung from engagement with the tooth 39$x$ of the cam 38$x$ and the danger signal 24$x$ will be swung to display position as heretofore.

In the arrangement just described, the release of the pawl from the cam will be brought about in the forward shifting or movement of the pendulum weight 72. However, in Figure 13 I have illustrated the same mechanism but with a slightly different timed relation. In this case the ratchets and gears are indicated as before, like letters of reference being applied as in Figures 9 to 11, inclusive, but with the superfix $y$.

In this case the parts are so designed that when the car stops and the pendulum weight 72$y$ swings forward, the pawl 74$y$ is merely brought to position to engage the next tooth of the ratchet 75$y$, but without moving said ratchet. Then, when the car is started up again, the weight 72$y$ will move rearwardly enough to operate the ratchet 75$y$ and, through it and the intermediate reduction mechanism, the ratchet wheel which operates the pawl 67$y$.

To provide for adjustment of the length of the moment arms of the weights 42, said weights are each provided with a socket 76 in which its radius rod 43 is secured by means of a set screw (see Figure 4). And to determine and limit the throw of said radius arms, a cross bar 78 is supported by the frame in the path of movement of said weights and is provided with screws 79 to be engaged and struck by said weights at the end of their path of movement.

In Figures 9, 9$a$ and 9$b$ I have shown a somewhat modified form of the mechanism for preventing the restoration of the signalling device to normal, by use of the emergency brake. 59$x$ indicates the cable connected to the emergency brake, as before. 61$x$ indicates a spring-controlled catch pivoted at 62$x$ to ears 63$x$ depending from the bottom of the frame 25$x$ in the plane of the cam 38$x$. On the cam 38$x$ is a spring-controlled pawl 64$x$ having a tooth 65$x$ which depends above the catch 61$x$. Said pawl is limited in its movement by a pin 66$x$ fixed to the cam 38$x$. In this case the cable 59$x$ leading from the brake, instead of being connected directly to the catch 61$x$ is attached to the heel 80 of a spring-controlled cam 81 pivoted at 82 to the frame 25$x$.

83 indicates a spring connecting the heel 80 of the cam 81 to the frame 25$x$, said spring being opposed to the pull of the cable 59$x$. The catch 61$x$ is provided intermediate its length with a cross bar 84 and the cam 81 has a belly 85 adapted to coact with the bar 84. Said cam also has a tooth 86 for engagement with said bar and a stop 87 adapted to limit its downward movement towards the catch 61$x$ when the cable 59$x$ is pulled to the right.

The parts in Figure 9 are shown when the emergency brake is off and the cam 38$x$ is in normal position with the safe signal on view. Should the weights fall and the danger signal be brought to view, the device may be operated in the usual manner by the foot brake to bring the safe signal to view, if said brakes meet the predetermined test.

In Figure 9$b$ the parts are shown with the emergency brake on. In this case the cam 81 has been swung by its spring 83 (the cable 59$x$ having been loosened) to swing so that its tooth 86 is brought close to the edge of the bar 84. Should the weights fall and the danger signal be brought to view, with the parts in the position shown in Figure 9$b$, the pawl 64$x$ will be swung with the cam 38$x$ so that it will assume the dotted position shown in said figure, with its tooth 65$x$ engaged back of the catch 61$x$. In order to restore the mechanism to the position shown in Figure 9, it will be required that the emergency brake be released. In doing this, the cable 59$x$ will swing the cam 81 from the position shown in Figure 9$b$ to the position shown in Figure 9, wherein the catch is depressed below the tooth 65$x$ of the cam 64$x$, which is thus released. The device as a whole may then be operated by the foot brakes.

In Figure 9$a$ is shown a position where the cable 59$x$ has been completely severed. In this case the cam 81, by its spring 83, will be moved so that its tooth 86 drops off the bar 84 to the catch 61$x$ and locks said catch. The entire device is then inoperative for any purpose until the parts have been disassembled and the cable again connected with the parts in position as shown in Figure 9.

I claim as my invention:

1. A signal and brake testing device for motor cars, including a normally displayed safety signal and a normally concealed danger signal movable to display position, an operating member for moving said danger signal to display position, locking means engaged with said operating member to retain said danger signal in concealed position, a gravity controlled device connected to said operating member for actuating the same, and means for releasing said locking means at predetermined intervals.

2. A signal and brake testing device for motor cars, including a normally displayed safety signal and a normally concealed danger signal movable to display position, an operating member for moving said danger signal to display position, locking means engaged with said operating member to retain said danger signal in concealed position, a gravity controlled device connected to said operating member for actuating the same, means for releasing said locking means at predetermined intervals, and a device associated with the operation of the car for determining said intervals.

3. A signal and brake testing device for motor cars, including a normally displayed safety signal and a normally concealed danger signal movable to display position, an operating member for moving said danger signal to display position, locking means engaged with said operating member to retain said danger signal in concealed position, an inverted pendulum device connected to said operating member for actuating the same, and means for releasing said locking means at predetermined intervals.

4. A signal and brake testing device for motor cars, including a normally displayed safety signal and a normally concealed danger signal movable to display position, an operating member for moving said danger signal to display position, locking means engaged with said operating member to retain said danger signal in concealed position, an inverted pendulum device connected to said operating member for actuating the same, means for releasing said locking means at predetermined intervals, and a device associated with the operation of the car for determining said intervals.

5. A signal and brake testing device for motor cars, including a normally displayed safety signal and a normally concealed danger signal movable vertically to shroud said safety signal, an operating member for imparting said vertical movement to said danger signal, locking means engaged with said operating member to retain said danger signal in concealed position, a gravity controlled device connected to said operating member for actuating the same, and means for releasing said locking means at predetermined intervals.

6. A signal and brake testing device for motor cars, including a normally displayed safety signal and a normally concealed danger signal movable vertically to shroud said safety signal, an operating member for imparting said vertical movement to said danger signal, locking means engaged with said operating member to retain said danger signal in concealed position, a gravity controlled device connected to said operating member for actuating the same, means for releasing said locking means at predetermined intervals, and a device associated with the operation of the car for determining said intervals.

7. A signal and brake testing device for motor cars, including a normally displayed safety signal and a normally concealed danger signal movable to display position, a horizontal rock shaft, means connecting said rock shaft to said danger signal, a toothed cam fixed to said rock shaft, an inverted pendulum device fixed to said rock shaft and normally standing in substantially vertical position, a pawl engaged with the tooth of said cam when said pendulum device is in said vertical position, and means for disengaging said pawl from said toothed cam at predetermined intervals.

8. A signal and brake testing device for motor cars, including a normally displayed safety signal and a normally concealed danger signal movable to display position, a horizontal rock shaft, means connecting said rock shaft to said danger signal, a toothed cam fixed to said rock shaft, an inverted pendulum device fixed to said rock shaft and normally standing in substantially vertical position, a pawl engaged with the tooth of said cam when said pendulum device is in said vertical position, means for disengaging said pawl from said toothed cam at predetermined intervals, and a device associated with the operation of the car for determining said intervals.

9. A signal and brake testing device for motor cars, including a normally displayed safety signal and a normally concealed, upwardly impelled danger signal movable to shroud said safety signal, a horizontal rock shaft, crank pin and pitman connection between said rock shaft and said danger signal, a toothed cam fixed to said rock shaft, an inverted pendulum device fixed to said rock shaft and normally standing in substantially vertical position, a pawl engaged with the tooth of said cam when said pendulum device is in said vertical position, and means for disengaging said pawl from said toothed cam at predetermined intervals.

10. A signal and brake testing device for motor cars, including a normally displayed safety signal and a normally concealed, upwardly impelled danger signal movable to shroud said safety signal, a horizontal rock shaft, crank pin and pitman connection between said rock shaft and said danger signal, a toothed cam fixed to said rock shaft, an inverted pendulum device fixed to said rock shaft and normally standing in substantially vertical position, a pawl engaged with the tooth of said cam when said pendulum device is in said vertical position, means for disengaging said pawl from said toothed cam at predetermined intervals, and a device associated with the operation of the car for determining said intervals.

11. A signal and brake testing device for motor cars, including a normally displayed safety signal and a normally concealed danger signal movable to display position, an operating member for moving said danger signal to display position, locking means engaged with said operating members to retain said danger signal in concealed position, a gravity controlled forwardly and rearwardly movable device connected to said operating member, means for arresting said device in its rearward movement in a position where it may be readily moved forward by an acquired momentum in a forward direction, means for releasing said locking means at predetermined intervals, and a blocking member movable to position to block the return movement of said operating member when the testing device is in inclined position.

12. A signal and brake testing device for motor cars, including a normally displayed safety signal and a normally concealed danger signal movable to display position, an operating member for moving said danger signal to display position, locking means engaged with said operating members to retain said danger signal in concealed position, a gravity controlled forwardly and rearwardly movable device connected to said operating member, means for arresting said device in its rearward movement in a position where it may be readily moved forward by an acquired momentum in a forward direction, means for releasing said locking means at predetermined intervals, means supporting a ball in the path of movement of said operating member, said means permitting said ball to roll to a position to block the return movement of said operating member when the testing device is in inclined position.

13. A signal and brake testing device for motor cars, including a normally displayed safety signal and a normally concealed danger signal movable to display position, an operating member for moving said danger signal to display position, locking means engaged with said operating member to retain said danger signal in concealed position, a gravity controlled forwardly and rearwardly movable device connected to said operating member, means for arresting said device in its rearward movement in a position where it may be readily moved forward by an acquired momentum in a forward direction, means for releasing said locking means at predetermined intervals, an emergency brake, a spring controlled catch associated with said operating member, means connecting said catch to said emergency brake, and a device connected to said operating member adapted to be engaged by said catch when said connection to the emergency brake is released at a time when the danger signal is at or near display position.

14. A signal and brake testing device for motor cars, including a normally displayed safety signal and a normally concealed danger signal movable to display position, an operating member for moving said danger signal to display position, locking means engaged with said operating member to retain said danger signal in concealed position, a gravity controlled forwardly and rearwardly movable device connected to said operating member, means for arresting said device in its rearward movement in a position where it may be readily moved forward by an acquired momentum in a forward direction, means for releasing said locking means at predetermined intervals, an emergency brake, and means connected to said emergency brake for blocking the return movement of said operating member when the emergency brake is used with said danger signal in display position.

15. A signal and brake testing device for motor cars, including a normally displayed safety signal and a normally concealed danger signal movable to display position, an operating member for moving said danger signal to display position, locking means engaged with said operating member to retain said danger signal in concealed position, a gravity controlled forwardly and rearwardly movable device connected to said operating member, means for arresting said device in its rearward movement in a position where it may be readily moved forward by an acquired momentum in a forward direction, means for releasing said locking means at predetermined intervals, a ratchet wheel for disengaging said locking means, a second ratchet wheel coaxial with said first named ratchet wheel and spaced therefrom, a pendulum mounted to swing on the common axis of said two ratchet wheels, a pawl carried by said pendulum and engaged with said second ratchet wheel, and reduction gearing intermediate said two ratchet wheels.

16. A signal and brake testing device for motor cars, including a normally displayed safety signal and a normally concealed danger signal movable to display position, an operating member for moving said danger signal to display position, locking means engaged with said operating member to retain said danger signal in concealed position, a gravity controlled, forwardly and rearwardly movable device connected to said operating member for actuating the same, means for arresting said device in its rearward movement in a position where it may be readily moved forward by an acquired momentum in a forward direction, and means for releasing said locking means at predetermined intervals.

17. A signal and brake testing device for motor cars, including a normally displayed safety signal and a normally concealed danger signal movable to display position, an operating member for moving said danger signal to display position, locking means engaged with said operating member to retain said danger signal in concealed position, a gravity controlled, forwardly and rearwardly movable device connected to said operating member for actuating the same, means for arresting said device in its rearward movement in a position where it may be readily moved forward by an acquired momentum in a forward direction, means for releasing said locking means at predetermined intervals, and a device associated with the operation of the car for determining said intervals.

18. A signal and brake testing device for motor cars, including a normally displayed safety signal and a normally concealed danger signal movable to display position, an operating member for moving said danger signal to display position, locking means engaged with said operating member to retain said danger signal in concealed position, an inverted forwardly and rearwardly movable pendulum device connected to said operating member, means for releasing said locking means at predetermined intervals, and means for arresting said pendulum device in its rearward movement in a position where it may be readily moved forward by an acquired momentum in a forward direction.

19. A signal and brake testing device for motor cars, including a normally displayed safety signal and a normally concealed danger signal movable to display position, an operating member for moving said danger signal to display position, locking means engaged with said operating member to retain said danger signal in concealed position, an inverted forwardly and rearwardly movable pendulum device connected to said operating member, means for releasing said locking means at predetermined intervals, a device associated with the operation of the car for determining said intervals, and means for arresting said pendulum device in its rearward movement in a position where it may be readily moved forward by an acquired momentum in a forward direction.

20. A signal and brake testing device for motor cars, including a normally displayed safety signal and a normally concealed danger signal movable vertically to shroud said safety signal, an operating member for imparting said vertical movement to said danger signal, locking means engaged with said operating member to retain said danger signal in concealed position, a gravity controlled forwardly and rearwardly movable device connected to said operating member, means for releasing said locking means at predetermined intervals, and means for arresting said gravity controlled device in its rearward movement in a position where it may be readily moved forward by an acquired momentum in a forward direction.

21. A signal and brake testing device for motor cars, including a normally displayed safety signal and a normally concealed danger signal movable vertically to shroud said safety signal, an operating member for imparting said vertical movement to said danger signal, locking means engaged with said operating member to retain said danger signal in concealed position, a gravity controlled forwardly and rearwardly movable device connected to said operating member, means for releasing said locking means at predetermined intervals, a device associated with the operation of the car for determining said intervals, and means for arresting said gravity controlled device in its rearward movement in a position where it may be readily moved forward by an acquired momentum in a forward direction.

22. A signal and brake testing device for motor cars, including a normally displayed safety signal and a normally concealed danger signal movable to display position, a horizontal rock shaft, means connecting said rock shaft to said danger signal, a toothed cam fixed to said rock shaft, an inverted forwardly and rearwardly movable pendulum device fixed to said rock shaft and normally standing in substantially vertical position, a pawl engaged with the tooth of said cam when said pendulum device is in said vertical position, means for disengaging said pawl from said toothed cam at predetermined intervals, and means for arresting the rearward movement of said pendulum device when in a rearwardly inclined position.

23. A signal and brake testing device for motor cars, including a normally displayed safety signal and a normally concealed danger signal movable to display position, a horizontal rock shaft, means connecting said rock shaft to said danger signal, a toothed cam fixed to said rock shaft, an inverted forwardly and rearwardly movable pendulum device fixed to said rock shaft and normally standing in substantially vertical position, a pawl engaged with the tooth of said cam when said pendulum device is in said vertical position, means for disengaging said pawl from said toothed cam at predetermined intervals, a device associated with the operation of the car for determining said intervals, and means for arresting said pendulum device in a rearwardly inclined position.

24. A signal and brake testing device for motor cars, including a normally displayed safety signal and a normally concealed, upwardly impelled danger signal movable to shroud said safety signal, a horizontal rock shaft, crank pin and pitman connection between said rock shaft and said danger signal, a toothed cam fixed to said rock shaft, an inverted forwardly and rearwardly movable pendulum device fixed to said rock shaft and normally standing in substantially vertical position, a pawl engaged with the tooth of said cam when said pendulum device is in said vertical position, means for disengaging said pawl from said toothed cam at predetermined intervals, and means for arresting said pendulum device in a rearwardly inclined position.

25. A signal and brake testing device for motor cars, including a normally displayed safety signal and a normally concealed, upwardly impelled danger signal movable to shroud said safety signal, a horizontal rock shaft, crank pin and pitman connection between said rock shaft and said danger signal, a toothed cam fixed to said rock shaft, an inverted forwardly and rearwardly movable pendulum device fixed to said rock shaft and normally standing in substantially vertical position, a pawl engaged with the tooth of said cam when said pendulum device is in said vertical position, means for disengaging said pawl from said toothed cam at predetermined intervals, a device associated with the operation of the car for determining said intervals, and means for arresting said pendulum device in a rearwardly inclined position.

RUSSELL G. BOURDON.